(12) United States Patent
Sampaio

(10) Patent No.: US 7,726,709 B2
(45) Date of Patent: Jun. 1, 2010

(54) VEHICLE BUMPER STRUCTURE

(75) Inventor: Sergio Sampaio, Sao Bernardo Do Campo-SP (BR)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 111 days.

(21) Appl. No.: 11/902,388

(22) Filed: Sep. 21, 2007

(65) Prior Publication Data

US 2008/0309102 A1 Dec. 18, 2008

(30) Foreign Application Priority Data

Sep. 27, 2006 (JP) ............................. 2006-262142

(51) Int. Cl.
*B60R 19/04* (2006.01)
(52) U.S. Cl. ...................... 293/122; 293/121; 293/120
(58) Field of Classification Search ................. 293/120, 293/121, 122, 132, 133
See application file for complete search history.

(56) References Cited

U.S. PATENT DOCUMENTS

| | | | |
|---|---|---|---|
| 5,031,947 A * | 7/1991 | Chen | 293/135 |
| 6,644,701 B2 * | 11/2003 | Weissenborn et al. | 293/120 |
| 7,004,519 B2 * | 2/2006 | Roussel et al. | 293/120 |
| 7,172,227 B2 * | 2/2007 | Weissenborn et al. | 293/121 |
| 7,198,309 B2 * | 4/2007 | Reynolds | 293/122 |
| 2004/0094975 A1 * | 5/2004 | Shuler et al. | 293/120 |
| 2004/0262931 A1 * | 12/2004 | Roussel et al. | 293/120 |
| 2006/0214439 A1 * | 9/2006 | Reynolds | 293/132 |

FOREIGN PATENT DOCUMENTS

| | | |
|---|---|---|
| DE | 36 42 979 A1 | 6/1988 |
| JP | 64-9857 | 1/1989 |
| JP | 05080916 U | 11/1993 |
| JP | 2000-85496 | 3/2000 |
| JP | 2005-088732 | 9/2003 |
| JP | 2005 001430 A | 1/2005 |
| WO | WO 03/051678 A1 | 6/2003 |

OTHER PUBLICATIONS

German Office Action dated Dec. 9, 2008.
Chinese Office Action for Application No. 200710151733.5 dated Mar. 20, 2009.
Satoshi Ichinose, Notification of Reasons for Refusal, Japanese Office Action, Jul. 29, 2008.

* cited by examiner

*Primary Examiner*—Patricia L Engle
(74) *Attorney, Agent, or Firm*—Finnegan, Henderson, Farabow, Garrett & Dunner, LLP

(57) ABSTRACT

A vehicle bumper structure includes a pipe member that extends along the vehicle-width direction. A bumper shock absorbing member extends along the vehicle-width direction, and has a loading space in which the pipe member is placed. A fixing member has a first end portion which is fixed to a vehicle body and a second end portion to which the bumper shock absorbing member is fixed. A bumper cover may be provided on the outer side of the bumper shock absorbing member, and cover the bumper shock absorbing member, the pipe member, and the fixing member.

7 Claims, 8 Drawing Sheets

PRIOR ART

VEHICLE BUMPER STRUCTURE

INCORPORATION BY REFERENCE

The disclosure of Japanese Patent Application No. 2006-262142 filed on Sep. 27, 2006 including the specification, drawings and abstract is incorporated herein by reference in its entirety.

BACKGROUND OF THE INVENTION

1. Field of the Invention

The invention relates to a vehicle bumper structure that includes a pipe member extending along the vehicle-width direction.

2. Description of the Related Art

Vehicle bumper structures that include pipe members have been suggested in recent years.

For example, Japanese Patent Application Publication No. 2000-85496 (hereinafter, referred to as "JP-A-2000-85496") describes a technology relating to a bumper structure designed to absorb a shock due to a so-called pole collision. According to the technology, a concave having a semi-circle cross section is formed along the vehicle-width direction in the outer face of a bumper reinforcement member, and a relatively short pipe member is welded to the bumper reinforcement member at the lateral center of the concave. After a bumper was assembled, the pipe member is half projected from the outer face of the bumper reinforcement member. If such pipe member collides with, for example, a pole, the collision load is transmitted through the pipe member and then dispersed through the surface of the concave formed in the bumper reinforcement member.

Japanese Utility Model Application Laid-Open Publication No. 64-9857 (hereinafter, referred to as "JP-U-64-9857") describes a technology relating to a bumper structure that includes a bumper-stay, which connects a front bumper cover and a side member to each other. According to the described technology, a bumper-bar, which is formed of a pipe member, is welded to the end portion of the bumper-stay in advance. The bumper-bar is then placed between horizontal ribs formed on the rear face of the front bumper cover. After that, the bumper-bar is fixed at this position with bolts. With this structure, an airflow, which is coming into the vehicle while the vehicle is moving, is introduced to both the upper and lower sides of the bumper-bar. As a result, the airflow cools an engine more efficiently.

Nowadays, there has been growing demand for the development of a bumper structure, which is provided at a lower cost, lighter, and, more easily assembled, while offering a sufficient level of energy absorption performance.

For example, JP-A-2000-85496 describes a technology in which a pipe member is welded to a bumper reinforcement member. However, this increases the vehicle weight, and complicates the assembly process due to the need for a welding process. According to JP-U-64-9857, a pipe member is used instead of a bumper reinforcement member. However, because a bumper-bar is welded to the end portion of a bumper-stay, the similar problems described above are left unsolved.

SUMMARY OF THE INVENTION

The invention provides a vehicle bumper structure which is provided at a lower cost, lighter, and, more easily assembled, while offering a predetermined level of energy absorption performance.

A vehicle bumper structure according to a first aspect of the invention includes: a lengthy pipe member that extends along the vehicle-width direction; a bumper shock absorbing member that extends along the vehicle-width direction, and that has a loading space in which the pipe member is placed; a fixing member that has a first end portion fixed to a vehicle body and a second end portion to which the bumper shock absorbing member is fixed; and a bumper cover that is provided on the outer side of the bumper shock absorbing member, and that covers the bumper shock absorbing member, the pipe member, and the fixing member.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF EMBODIMENT

Hereinafter, a vehicle bumper structure according to an embodiment of the invention will be described with reference FIG. 1 to FIG. 8. In FIG. 1 to FIG. 8, the arrow "Rr" indicates the rear side of a vehicle, the arrow "UP" indicates the upper side of the vehicle, and the arrow "IN" indicates the inner side of the vehicle in the vehicle-width direction.

Figure 1:
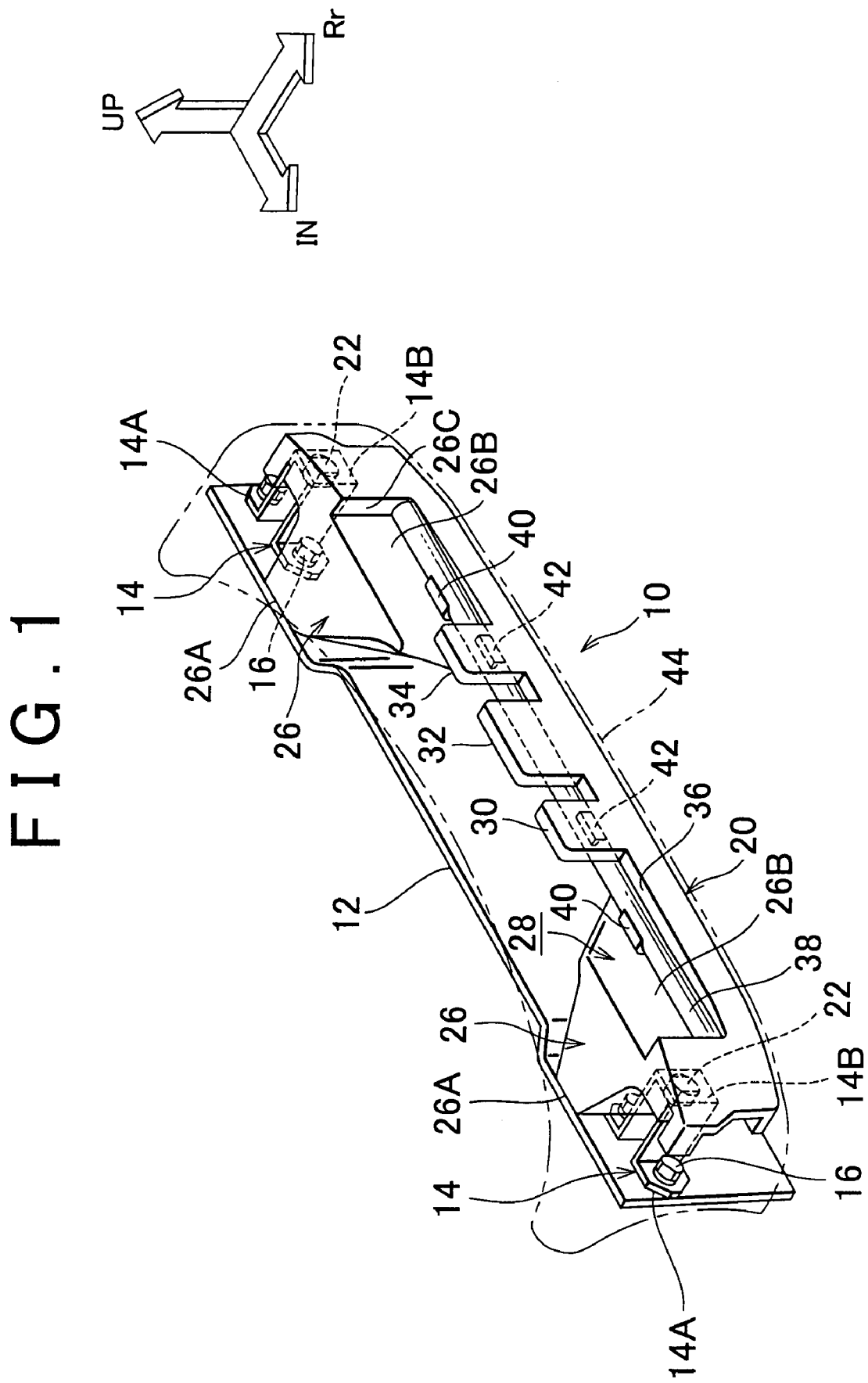
FIG. 1 is a perspective view of a rear bumper according to an embodiment of the invention in the assembled state.
Figure 2:
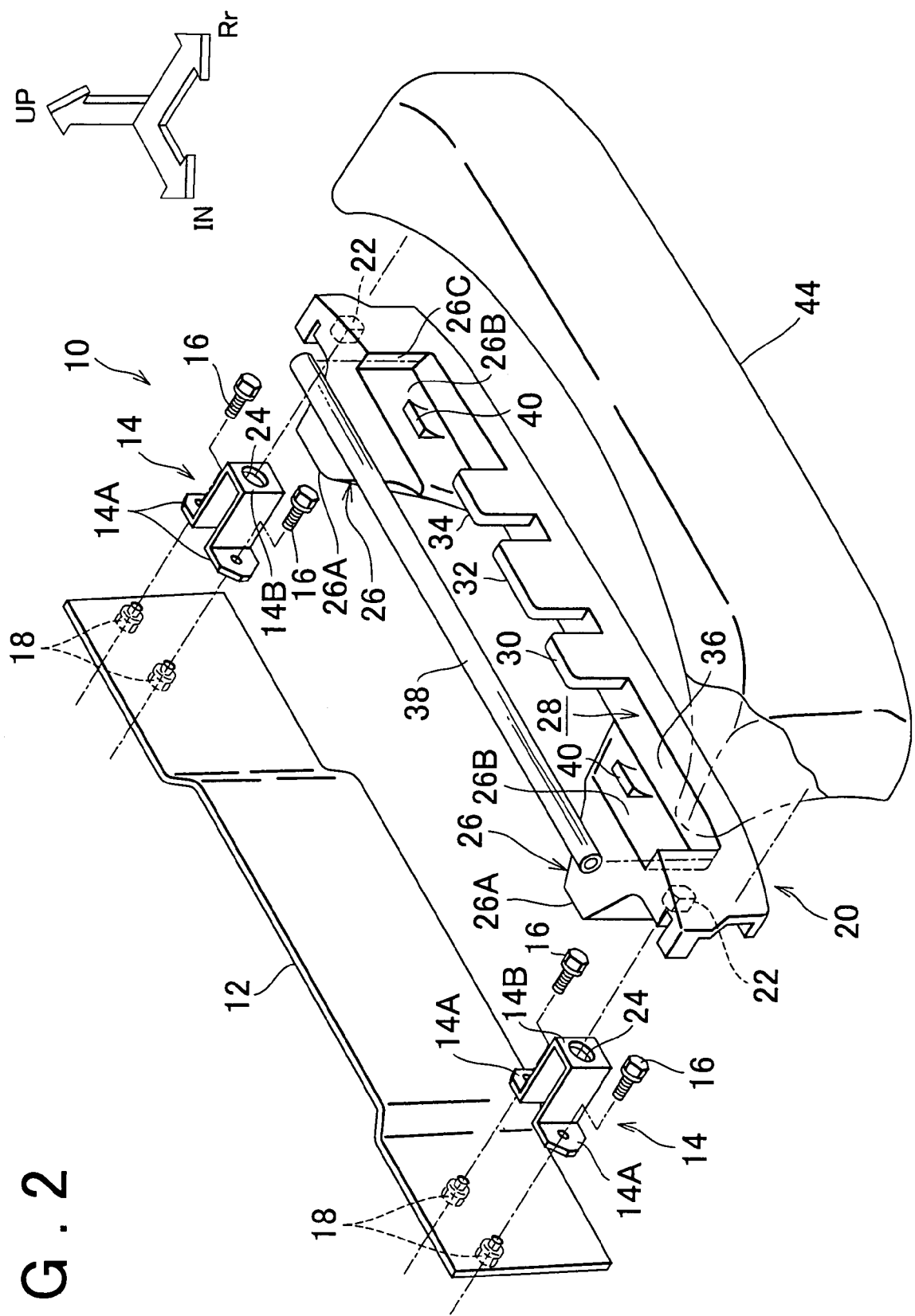
FIG. 2 is an exploded perspective view of the rear bumper shown FIG. 1.
Figure 3:
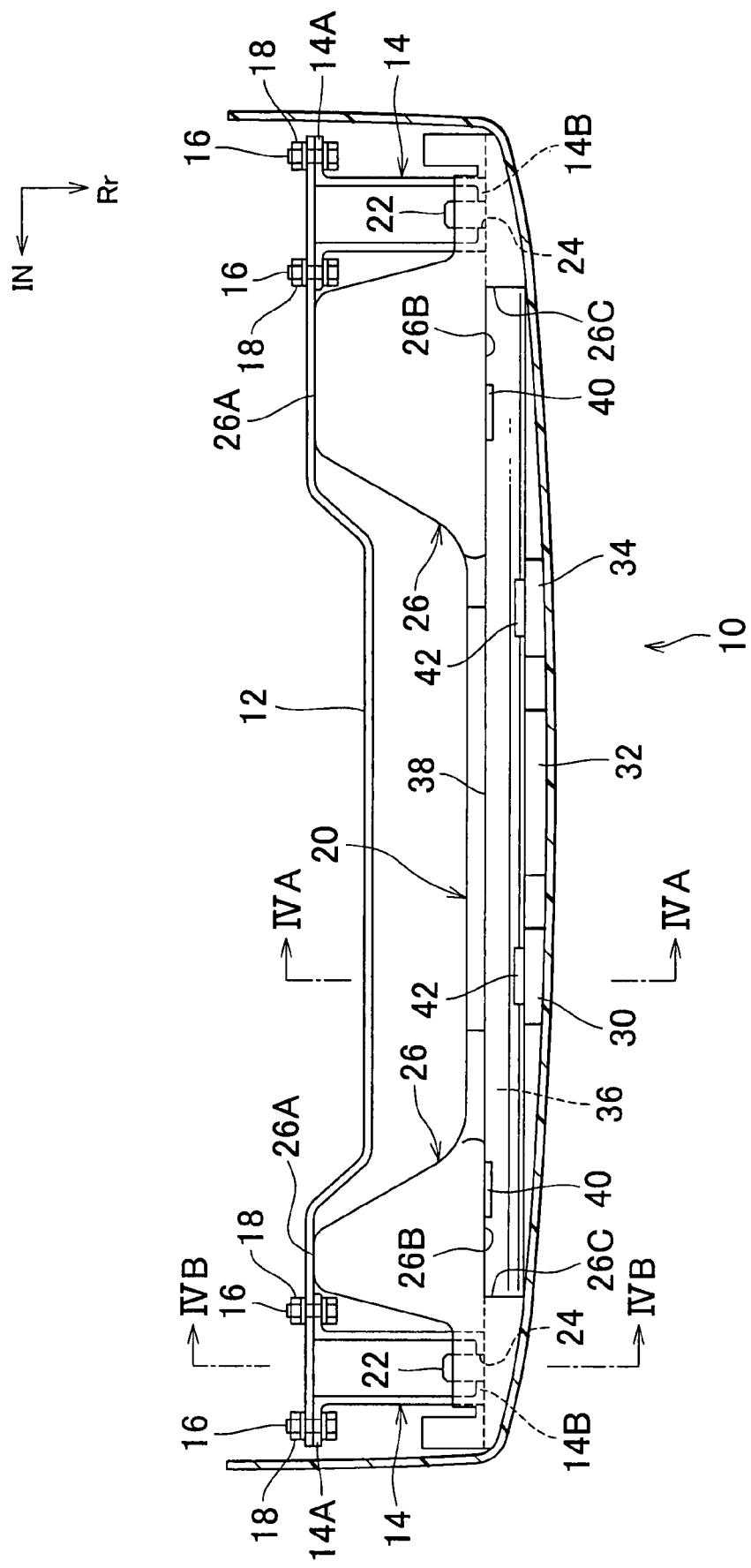
FIG. 3 is a horizontal cross-sectional view of the rear bumper shown FIG. 1.
Figure 4A:
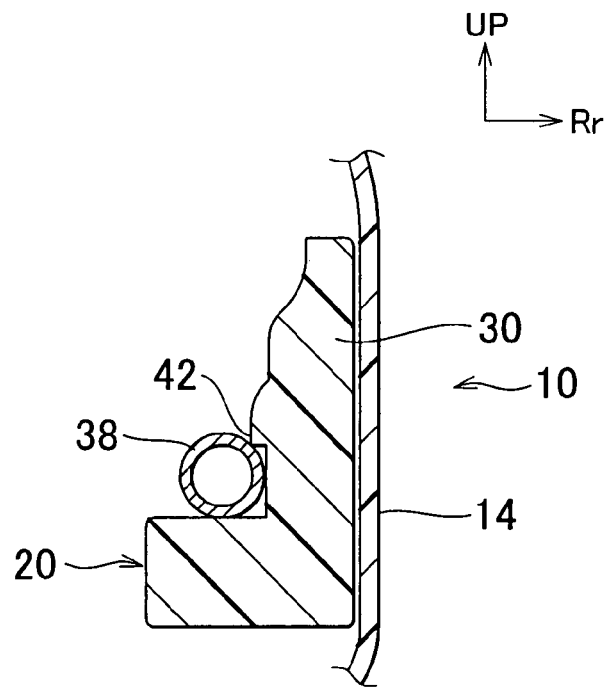
FIG. 4A is a vertical cross-sectional view of the rear bumper taken along the line IVA-IVA in FIG. 3.
Figure 4B:
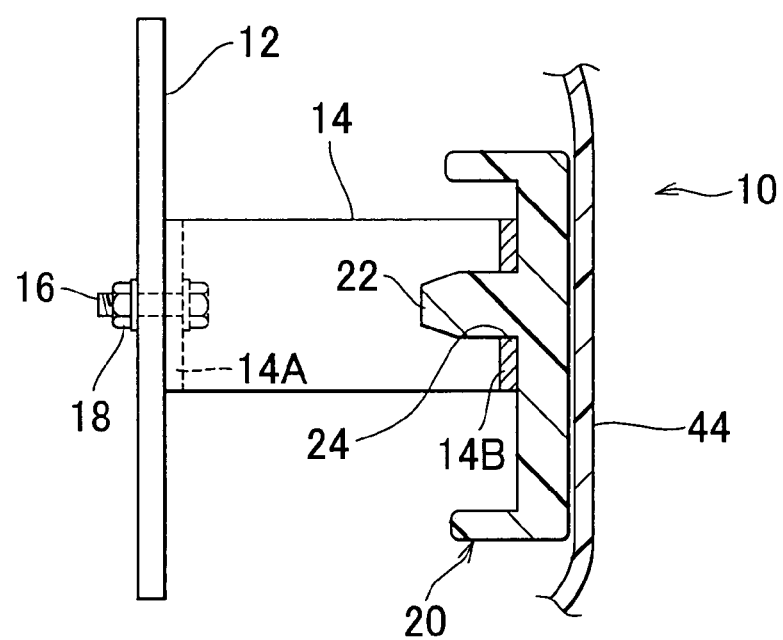
FIG. 4B is a vertical cross-sectional view of the rear bumper taken along the line IVB-IVB in FIG. 3.

FIG. 1 is a perspective view of a rear bumper 10 according to the embodiment of the invention in the assembled state. FIG. 2 is an exploded perspective view of the rear bumper 10. FIG. 3 is a horizontal cross-sectional view of the assembled rear bumper 10. FIG. 4A and FIG. 4B are vertical cross-sectional views of the assembled rear bumper 10.

As shown in FIGS. 1 to 4B, the rear bumper 10, which extends along the vehicle-width direction, is provided at the rear end portion of the vehicle. The rear bumper 10 is fitted to a lower back panel 12 that is substantially vertically arranged at the rear end portion of a vehicle body. More specifically, rear arms 14, which extend toward the rear of the vehicle, are fitted to the lower back panel 12 at the respective end portions in the longitudinal direction of the lower back panel 12, and are used as a fixing member that fixes the rear bumper 10 to the lower back panel 12. Each of the rear arms 14 is substantially hat-shaped when seen from above or below, and the base end portions thereof are bent toward the opposite directions to form paired front-end flange portions 14A. The paired front-end flange portions 14A are fixed, in a cantilever support state, to the lower back panel 12 which is fixed to rear end portions of paired rear side members (not shown). The front-end flange portions 14A are fixed to the lower back panel 12 with bolts 16 and weld-nuts 18. In the embodiment of the invention, each of the rear arms 14 is substantially hat-shaped when seen from above or below. However, the shape of the rear arm 14 is not limited to this. Alternatively, each of the rear arms 14 may be formed in a hollow prismatic shape. Here, each of the rear arms 14 may be regarded as a "fixing member" of the invention.

A rear bumper absorber 20 that extends along the vehicle-width direction is arranged between rear-end portions 14B of a pair of the rear arms 14 described above. The rear bumper absorber 20 is made of foam material (for example, polypropylene resin beads), and is formed as a lengthy member that extends along the vehicle-width direction. The material of the rear bumper absorber 20 is not limited to foam material. The rear bumper absorber 20 may be regarded as a "bumper shock absorbing material" of the invention.

At predetermined positions which are in the rear face (i.e., the face toward the front of the vehicle) of the rear bumper absorber 20, and which are at the respective end portions of the rear bumper absorber 20 in the longitudinal direction thereof (i.e., at positions corresponding to the rear-end portions 14B of the rear arms 14), paired projecting portions 22, which project toward the front of the vehicle, are formed integrally with the rear bumper absorber 20. As shown in FIG. 2, circular fitting holes 24, which correspond to the projecting portions 22, are formed in the center regions of the rear-end portions 14B of the respective rear arms 14. The projecting portions 22 of the rear bumper absorber 20 are fitted in the respective circular fitting holes 24 which are formed in the rear-end portions 14B of the rear arms 14. As a result, the rear bumper absorber 20 is fitted to the rear arms 14. The fitting hole 24 and projecting portion 22 may be regarded, in cooperation, as "fitting means" of the invention.

Paired salient portions 26, which project toward the front of the vehicle, are formed integrally with the rear face of the rear bumper absorber 20 at positions near respective end portions in the longitudinal direction of the rear bumper absorber 20. Each of the paired salient portions 26 is formed in a substantially trapezoid shape when seen from above or below. Front-end portions 26A of the salient portions 26 contact the lower back panel 12. Alternatively, the front-end portions 26A of the salient portions 26 may be slightly apart from the lower back panel 12. After the rear bumper 10 was assembled, the rear arms 14 are located adjacent to and further outward than the respective salient portions 26 in the vehicle-width direction, as shown FIG. 3.

A recess 28, which linearly extends along the vehicle-width direction, is formed at the center portion of the rear bumper absorber 20 (i.e., the middle portion of the rear bumper absorber 20 in the longitudinal direction of the vehicle). The recess 28 is open toward the upper side of the bumper. Rear-end faces 26B of the salient portions 26 and side-end faces 26C that are orthogonal to the rear-end faces 26B, are respectively arranged at the respective end portions of the recess 28 in the longitudinal direction the recess 28. The side-end faces 26C function as stoppers that prevent a pipe member 38, described in detail later, from moving in the vehicle-width direction while the vehicle is moving.

The rear-end face of the rear bumper absorber 20 is convexly curved toward the rear of the vehicle (i.e., the rear-end face of the rear bumper absorber 20 has a curved shape) when seen from above or below. Multiple (three, in the embodiment) vertical walls 30, 32, and 34 are arranged at the center portion of the rear bumper absorber 20 (i.e., at the middle portion of the rear bumper absorber 20 in the vehicle-width direction) at appropriate intervals. The front faces of these vertical walls 30, 32, and 34 (i.e., the faces toward the front of the vehicle) are aligned in the same straight line that extends along the vehicle-width direction. A loading space 36 is formed between these vertical walls 30, 32 and 34, and the salient portions 26. The bottom face that defines the loading space 36 has a predetermined width (the width slightly greater than the outer diameter of the pipe member 38 described in detail later), which corresponds to the width of the bottom face of the liner recess 28. The straight pipe member 38 is inserted, from above the rear bumper 10, and placed in the loading space 36. Here, the vertical walls 30, 32, and 34 may be regarded as "wall members" of the invention. The loading face of the loading space 36 (i.e., the bottom face of the liner recess 28) may be formed in a flat face such that the pipe member 38 contacts the loading face throughout its length. Alternatively, the loading face of the loading space 36 may be partially and slightly uplifted to form contacting points at predetermined intervals. With this structure, the pipe member 38 contacts the loading face of the loading space 36 at the contacting points.

The pipe member 38 is formed of a circular iron pipe, for example, and has predetermined strength and rigidity. The entire length of the pipe member 38 is set to a value substantially the same as the length of the loading space 36 in the vehicle-width direction. Alternatively, the entire length of the pipe member 38 may be set to a value slightly shorter than the length of the loading space 36 in the vehicle-width direction.

Clicks 40, which hold the pipe member 38 at the assembled position, are formed integrally with the rear-end faces 26B of the salient portions 26 of the rear bumper absorber 20. In a similar fashion, clicks 42 (see FIG. 4A), which are similar in shape to the clicks 40, are formed on the front faces of the two vertical walls 30 and 34 from among the three vertical walls 30, 32, and 34. Each of the paired clicks 40 that are formed on the rear-end faces 26B of the salient portions 26 holds the pipe member 38 at its respective end portions in the longitudinal direction of the pipe member 38. Furthermore, each of the paired clicks 42 that are formed on the two respective vertical walls 30 and 34 holds the pipe member 38 at its middle portions in the longitudinal direction of the pipe member 38. Namely, the pipe member 38 is firmly held from both sides in the longitudinal direction of the vehicle and pressed from above by the clicks 40 and 42. In this manner, the pipe member 38 is firmly held in the loading space 36 of the rear bumper absorber 20. The clicks 40 and 42 may be regarded as "holding means" of the invention.

The pipe member 38 is fitted to the rear bumper absorber 20, and the rear bumper absorber 20 is fitted to the rear arms 14. This rear bumper absorber 20 is covered with a rear bumper cover 44 that is fixed to the vehicle body.

Next, the effects of the embodiment will be described.

First, the steps to assemble the rear bumper 10 according to the embodiment of the invention will be described. As shown in FIG. 2, the rear arms 14 are fitted to the lower back panel 12 at the respective end portions in the longitudinal direction of the lower back panel 12. In this step, the weld-nuts 18, which are welded in advance to the front face (i.e., the face toward the front of the vehicle) of the lower back panel 12, are aligned over bolt-holes formed in the rear arms 14, and the bolts 16 are inserted in the respective bolt-holes from the rear side of the vehicle and screwed with the weld-nuts 18. Alternatively, ordinary nuts may be used instead of the weld-nuts 18.

Next, the paired projecting portions 22 of the rear bumper absorber 20 are fitted into the fitting holes 24 which are formed in the rear arms 14 that have been already assembled to the lower back panel 12. As a result, the rear bumper absorber 20 is assembled to and supported by the paired rear arms 14.

Next, the pipe member 38 is inserted, from above the recess 28 of the rear bumper absorber 20, and placed in the loading space 36. At this time, the clicks 40 that are formed on the rear-end faces 26B of the salient portions 26 and the clicks 42 that are formed on the front faces of the vertical walls 30 and 34, are elastically engaged with the pipe member 38. As a result, the pipe member 38 is stably held in the loading space 36 of the rear bumper absorber 20. Alternatively, the pipe member 38 may be placed in the liner recess 28 of the rear bumper absorber 20 in advance, and then the rear bumper absorber 20 may be fitted to the rear arms 14.

Finally, the rear bumper cover 44 is fitted to and fixed to the vehicle body. Thus, the assembly of the rear bumper 10 is completed.

Figure 6:
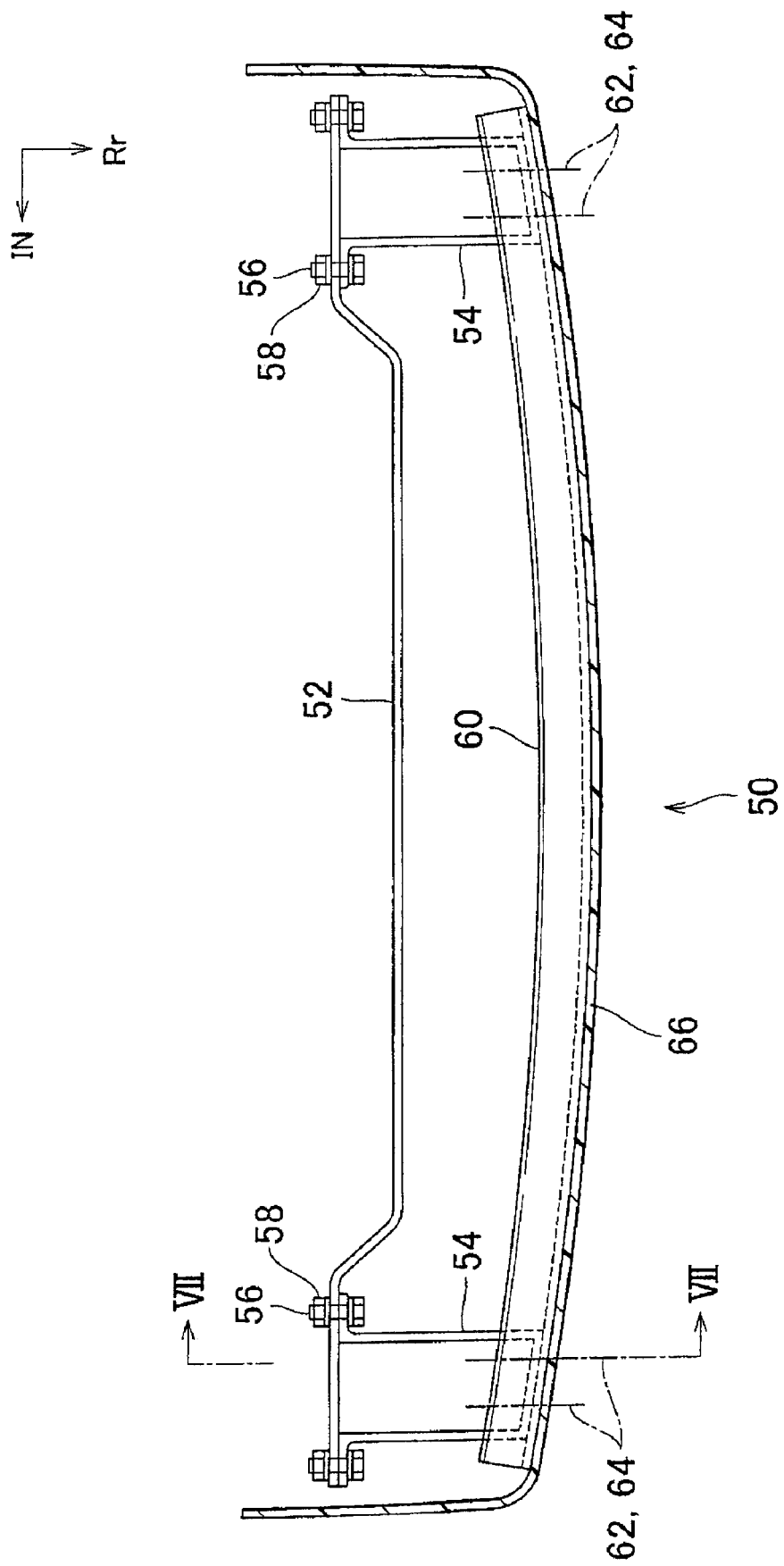
FIG. 6 is a horizontal cross-sectional view of the rear bumper according to the comparative example with respect to the embodiment of the invention.
Figure 7:
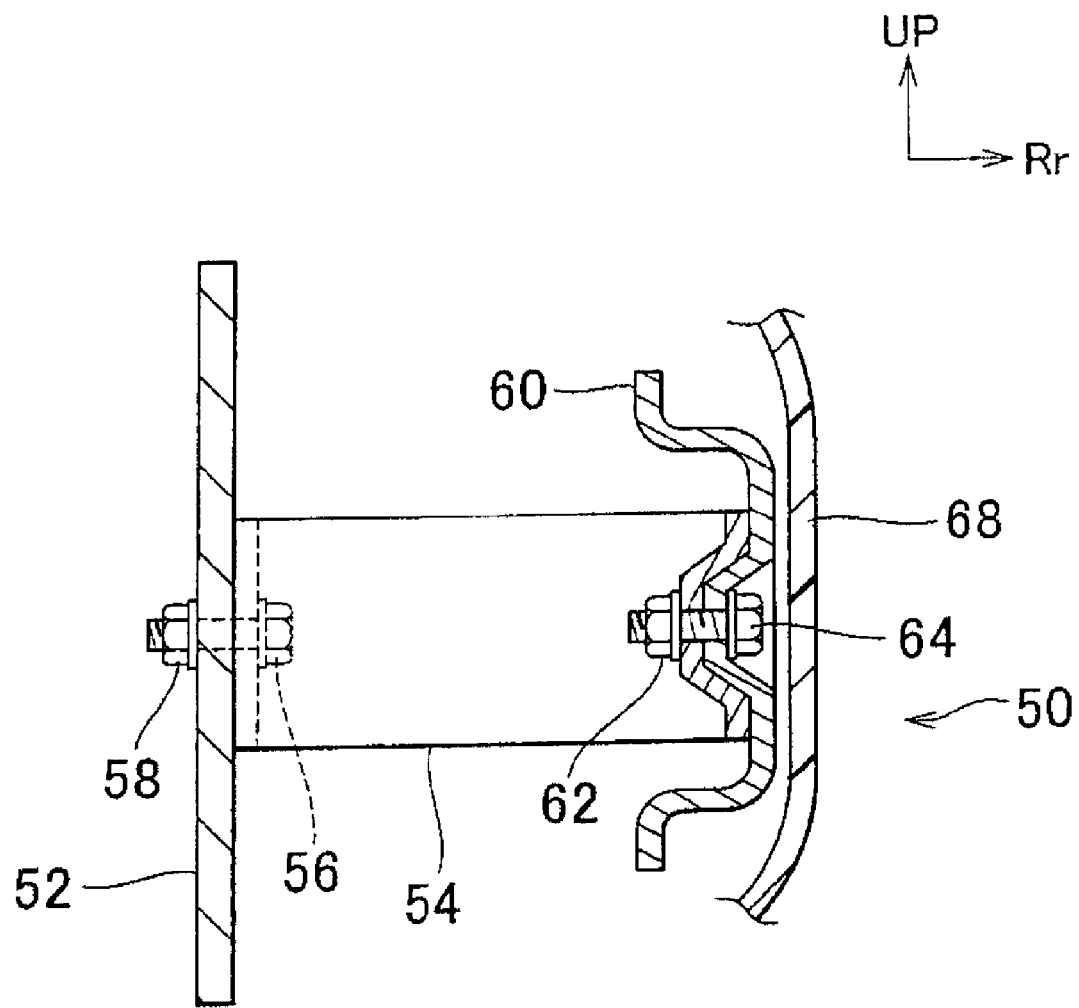
FIG. 7 is a vertical cross-sectional view of the rear bumper taken along the line VII-VII in FIG. 6.
Figure 8:
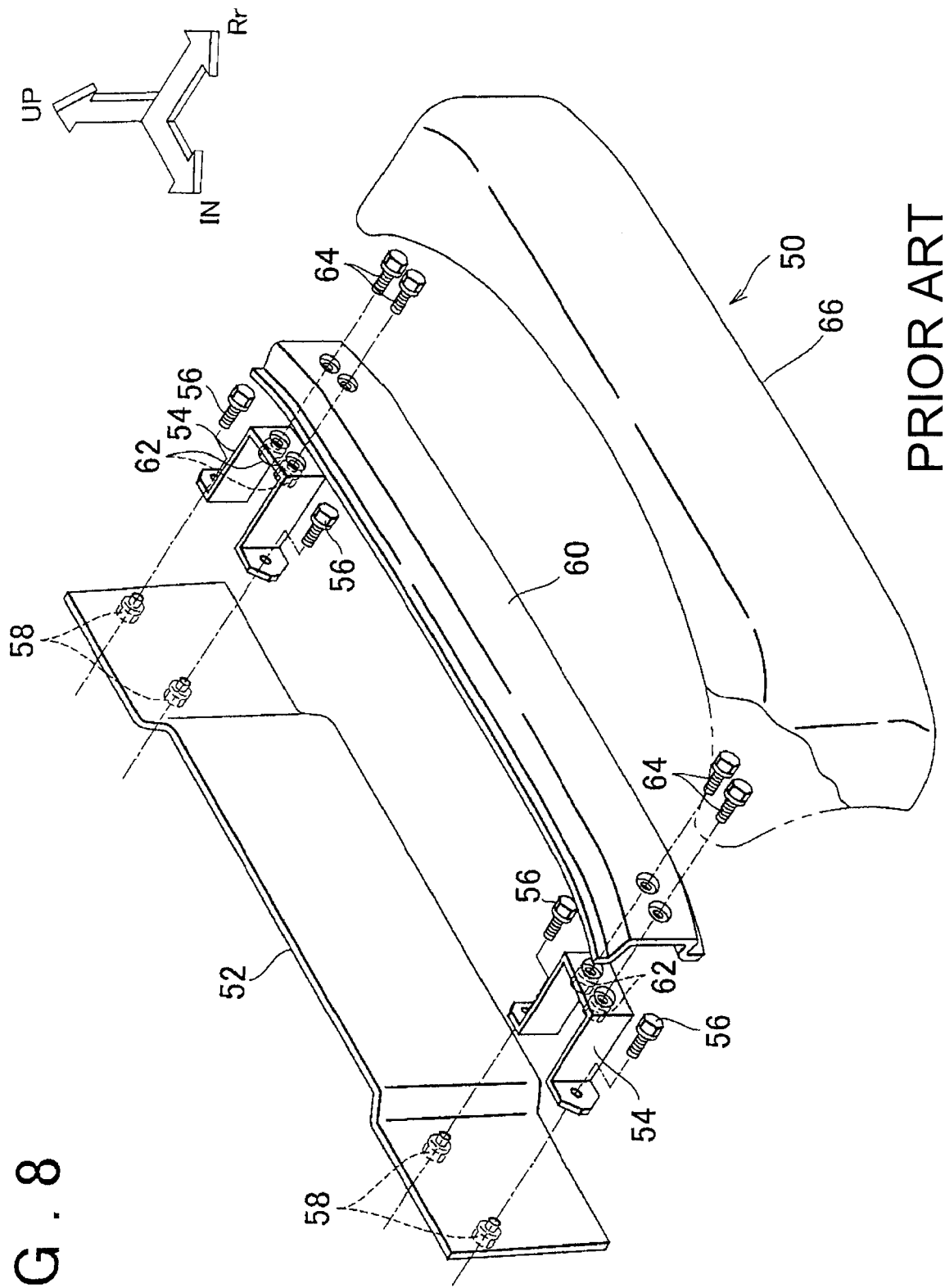
FIG. 8 is an exploded perspective view of the rear bumper according to the comparative example with respect to the embodiment of the invention.

FIG. 6 is a horizontal cross-sectional view of a rear bumper 50 in the assembled state according to a comparative example with respect to the embodiment of the invention. FIG. 7 is a vertical cross-sectional view of the rear bumper 50 taken along the line VII-VII in FIG. 6. FIG. 8 is an exploded perspective view of the rear bumper 50 with respect to the embodiment of the invention.

As shown, particularly, in FIG. 8, in order to assemble the rear bumper 50 according to the comparative example, first, rear arms 54 are fitted to a lower back panel 52 at the respective end portions in the longitudinal direction of the lower back panel 52. In this step, weld-nuts 58, which are welded in advance to the front face (i.e., the face towards the front of the vehicle) of the lower back panel 52, are aligned over bolt-holes formed in the rear arms 54, and bolts 56 are inserted in the respective bolt-holes from the rear side of the vehicle and screwed with the weld-nuts 58. Accordingly, the assembly process described so far is the similar to that of the embodiment of the invention.

Next, a rear bumper reinforcement member 60 that has a hat-shaped cross-section is fixed to rear-end portions of the rear arms 54 with bolts 64 and weld-nuts 62. In this comparative example, bolting is also employed in this fixing step of the rear bumper reinforcement member 60. Namely, the weld-nuts 62 are welded in advance to the rear faces (i.e., the faces toward the front of the vehicle) of the rear-end portions of the rear arms 54. The bolts 64 are screwed with the weld-nuts 62 from the rear side of the vehicle. In this manner, the rear bumper reinforcement member 60 is fitted to a pair of the rear arms 54.

Finally, the rear bumper cover 66 is fitted to and fixed to the vehicle body. Thus, the assembly of the rear bumper 50 is completed. This step is the similar to that of the embodiment of the invention.

Accordingly, the embodiment of the invention differs from the comparative example in that the pipe member 38, which is used instead of the rear bumper reinforcement member 60, is placed in the loading space 36 of the rear bumper absorber 20. Therefore, the welding step, etc. are no longer required, which simplifies the assembly of the rear bumper (i.e., which prevents complication of the assembly of the rear bumper).

Hereinafter, the description will be provided concerning the energy absorption performance of the rear bumper 10 according to the embodiment of the invention when the rear bumper 10 collides with an obstacle.

When the rear bumper 10 collides with an obstacle, the collision load is applied to the rear bumper cover 44, and then transmitted to the rear bumper absorber 20. The rear bumper absorber 20 is elastically deformed (i.e., compressed) in the longitudinal direction of the vehicle to absorb the collision energy. An excessive collision load that fails to be absorbed by the rear bumper absorber 20 is transmitted to the pipe member 38 that is placed in the loading space 36 of the rear bumper absorber 20. The pipe member 38 is a lengthy member that has high strength and high rigidity and that extends along the vehicle-width direction. Therefore, the pipe member 30 is plastically deformed to absorb the excessive collision load that is transmitted from the rear bumper absorber 20. Then, only another excessive collision load that fails to be absorbed by the pipe member 38 is transmitted to the rear side members through the rear arms 14 and lower back panel 12, and is finally absorbed by the rear side members. As explained so far, the rear bumper structure according to the embodiment of the invention may also offer sufficient level of energy absorption performance.

Figure 5:
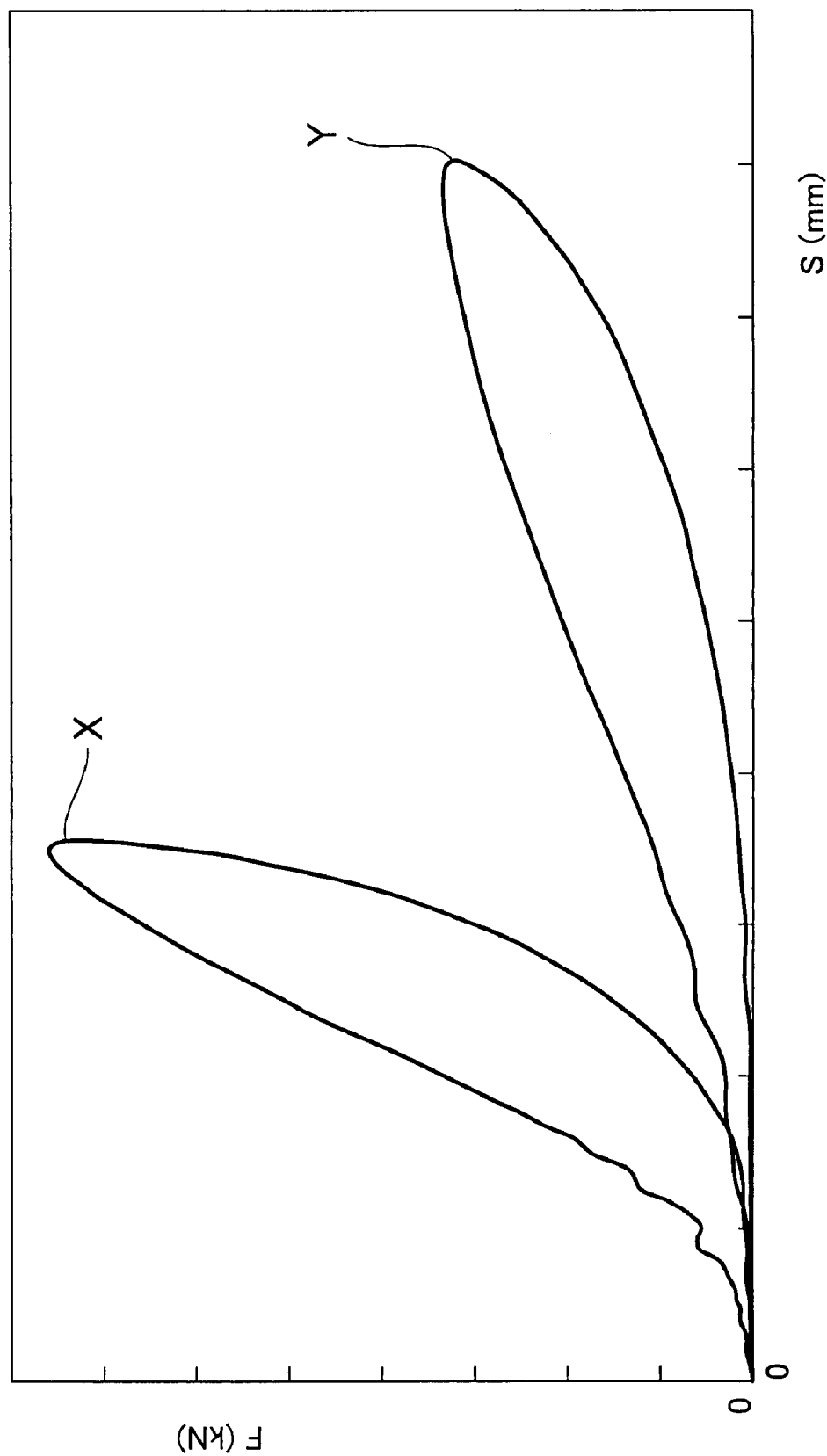
FIG. 5 is a graph showing Force-Stroke properties of each of the rear bumper according to the embodiment of the invention and a rear bumper according to a comparative example.

The graph X in FIG. 5 shows Force-Stroke properties of the rear bumper 10 according to the embodiment of the invention. The graph Y in FIG. 5 shows the energy absorption properties of the rear bumper 50 according to the comparative example, which is not provided with the pipe member 38. As can be seen from the comparison between the graph X and graph Y, the amount of the energy absorbed by the rear bumper 10 according to the embodiment of the invention (indicated by the area within the graph X) is substantially equal to the amount of energy absorbed by the rear bumper 50 according to the comparative example (indicated by the area within the graph Y). As can also be seen from FIG. 5, the rear bumper 10 according to the embodiment of the invention offers the same level of energy absorption performance in a shorter stroke as compared with the rear bumper 50 according to the comparative example. As described above, the collision load is efficiently absorbed by the elastic deformation of the rear bumper absorber 20 and the plastic deformation of the pipe member 38. Only another excessive collision load that fails to be absorbed by the rear bumper absorber 20 and the pipe member 38 is transmitted to the rear side members (not shown) through the rear arms 14 and lower back panel 12, and is finally absorbed by the rear side members. Accordingly, the lower back panel 12, which is arranged proximal to the vehicle body, may be not deformed at all, or even if it is deformed, the amount of the deformation of the lower back panel 12 may be considerably small.

In the rear bumper structure according to the embodiment of the invention, the bumper reinforcement member used in the comparative example is no longer required because the pipe member 38 is formed of a lengthy member that extends along the vehicle-width direction. Therefore, the rear bumper 10 that is lower in weight and production cost than the rear bumper 50 may be implemented.

The description above is summarized as follows: according to the embodiment of the invention, it is possible to implement the rear bumper structure which is produced at a lower cost, lighter, and in addition, more easily assembled, while offering sufficient level of energy absorption performance.

In the rear bumper structure according to the embodiment of the invention, the rear bumper absorber 20 is connected to the rear arms 14 by fitting the projecting portions 22 of the rear bumper absorber 20 into the fitting holes 24 of the rear arms 14. This fitting structure is employed on the precondition that the rear bumper absorber 20 is connected to and disconnected from the rear arms 14 in the longitudinal direction of the vehicle. As a result, the bolting step as well as the welding step is no longer necessary to fit the rear bumper absorber 20 to the rear arms 14. Accordingly, the total number of the parts and the production steps may be reduced. According to the embodiment of the invention, the rear bumper 10 may be assembled more efficiently. In addition, the bolting step is not required, unlike the compared example. Therefore, the efficiency of the assembly may be further enhanced and the production cost may be further reduced.

The pipe member 38 that is used instead of the rear bumper reinforcement member 60 is inserted from above the rear bumper 10 and placed in the loading space 36 of the rear bumper absorber 20. Accordingly the worker may perform this inserting step while looking downward. This means that workability is good and the workload is light. The clicks 40, 42 are formed integrally with the rear bumper absorber 20. Accordingly, when the pipe member 38 is placed in the loading space 36, the pipe member 38 is firmly held in the loading space 36 of the rear bumper absorber 20 by the clicks 40, 42. Accordingly, when the vehicle runs on a bumping road, the pipe member 38 is not wobbled in the liner recess 28 that is formed in the rear bumper absorber 20. Therefore, according to the embodiment of the invention, the abnormal noise due to wobbling of the pipe member 38 may be reduced.

In the embodiment of the invention described above, the pipe member 38 is formed of a circular iron tube. However, the material for the pipe member 38 is not limited to this. Alternatively, an aluminum alloy may be also applicable. Further, the cross sectional shape of the pipe member is not limited circle. In other words, any metal pipe members having predetermined strength and rigidity may be employed as the pipe member 38.

In the embodiment described above, the invention is applied to the rear bumper 10, however the invention may be applicable to a front bumper if the structure of the vehicle body is suitable for the application of the invention.

While the invention has been described with reference to an example embodiment thereof, it is to be under stood that the invention is not limited to the described embodiment or constructions. To the contrary, the invention is intended to cover various modifications and equivalent arrangements. In addition, while the various elements of the example embodiment are shown in various combinations and configurations, other combinations and configurations, including more, less or only a single element, are also within the spirit and scope of the invention.

What is claimed is:

1. A vehicle bumper structure, comprising:
    a pipe member that extends along a vehicle-width direction;
    a bumper shock absorbing member that extends along the vehicle-width direction, and that has a loading space in which the pipe member is placed;
    a fixing member that has a first end portion which is fixed to a vehicle body and a second end portion to which the bumper shock absorbing member is fixed;
    a bumper cover that is provided on an outer side of the bumper shock absorbing member, and that covers the bumper shock absorbing member, the pipe member, and the fixing member;
    the loading space is formed such that the pipe member is inserted from above the vehicle bumper to the loading space; and
    a holding member that holds the pipe member in the loading space,
    wherein the holding member and the bumper shock absorbing member are defined by an integral, unitary piece of material.

2. The vehicle bumper structure according to claim 1, wherein
    the fixing member extends along a longitudinal direction of a vehicle in an assembled state,
    the bumper shock absorbing member is connected to and disconnected from the fixing member in the longitudinal direction of the vehicle, and
    the bumper shock absorbing member and the bumper fixing member are connected to each other by a fitting unit.

3. The vehicle bumper structure according to claim 2, wherein
    the fitting unit includes a fitting hole which is formed integrally with the bumper shock absorbing member, at a position that corresponds to the fitting hole, and
    the bumper shock absorbing member is fixed to the fixing member by fitting the projecting portion into the fitting hole.

4. The vehicle bumper structure according to claim 1, wherein
    the bumper shock absorbing member is provided with a plurality of wall members.

5. The vehicle bumper structure according to claim 4, wherein
    the holding member is provided in plurality, and
    at least one of the plurality of holding members is formed on the plurality of wall members.

6. The vehicle bumper structure according to claim 1, wherein
    the bumper shock absorbing member is provided with a salient portion that extends toward a front of the vehicle.

7. The vehicle bumper structure according to claim 1, wherein
    the bumper shock absorbing member is made of foam material.

* * * * *